June 27, 1967  H. NIRENBERG  3,327,543
REVERSE-MOTION-PRECLUDING RATCHET MECHANISM
Filed June 8, 1965
3 Sheets-Sheet 1

INVENTOR

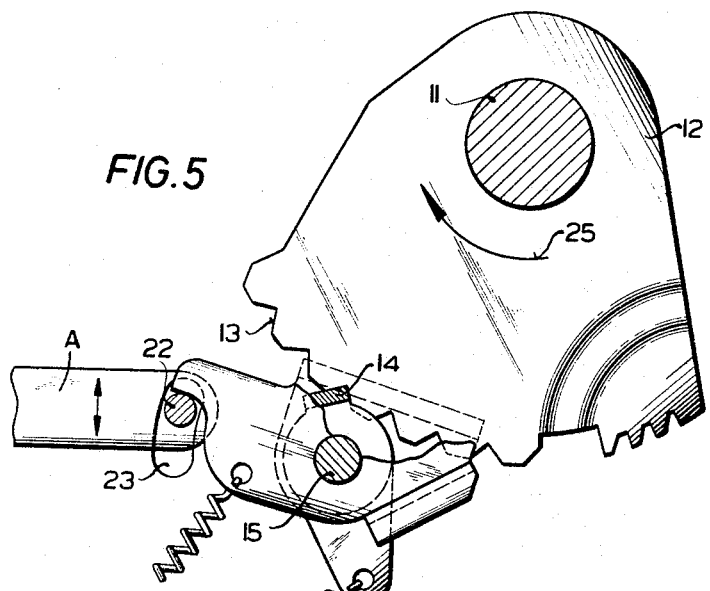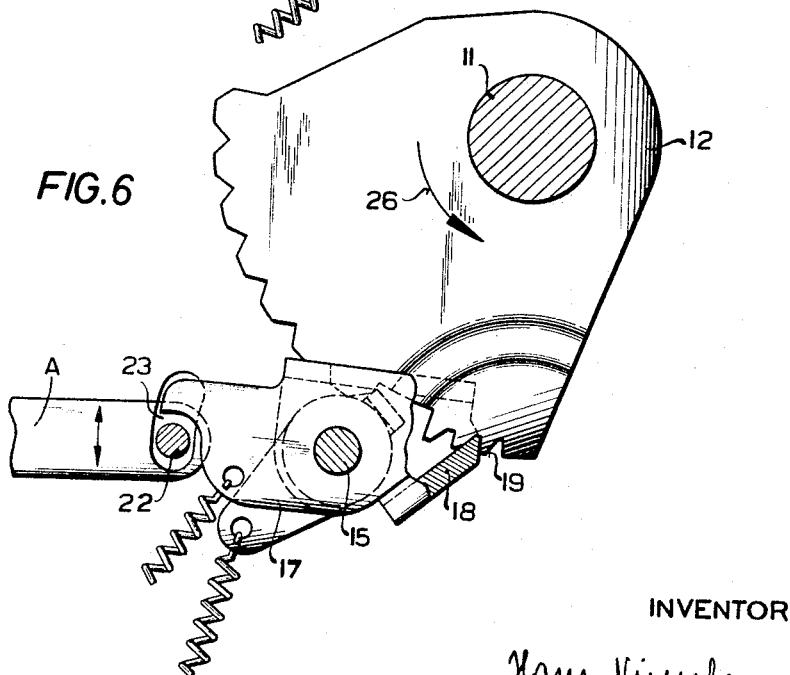

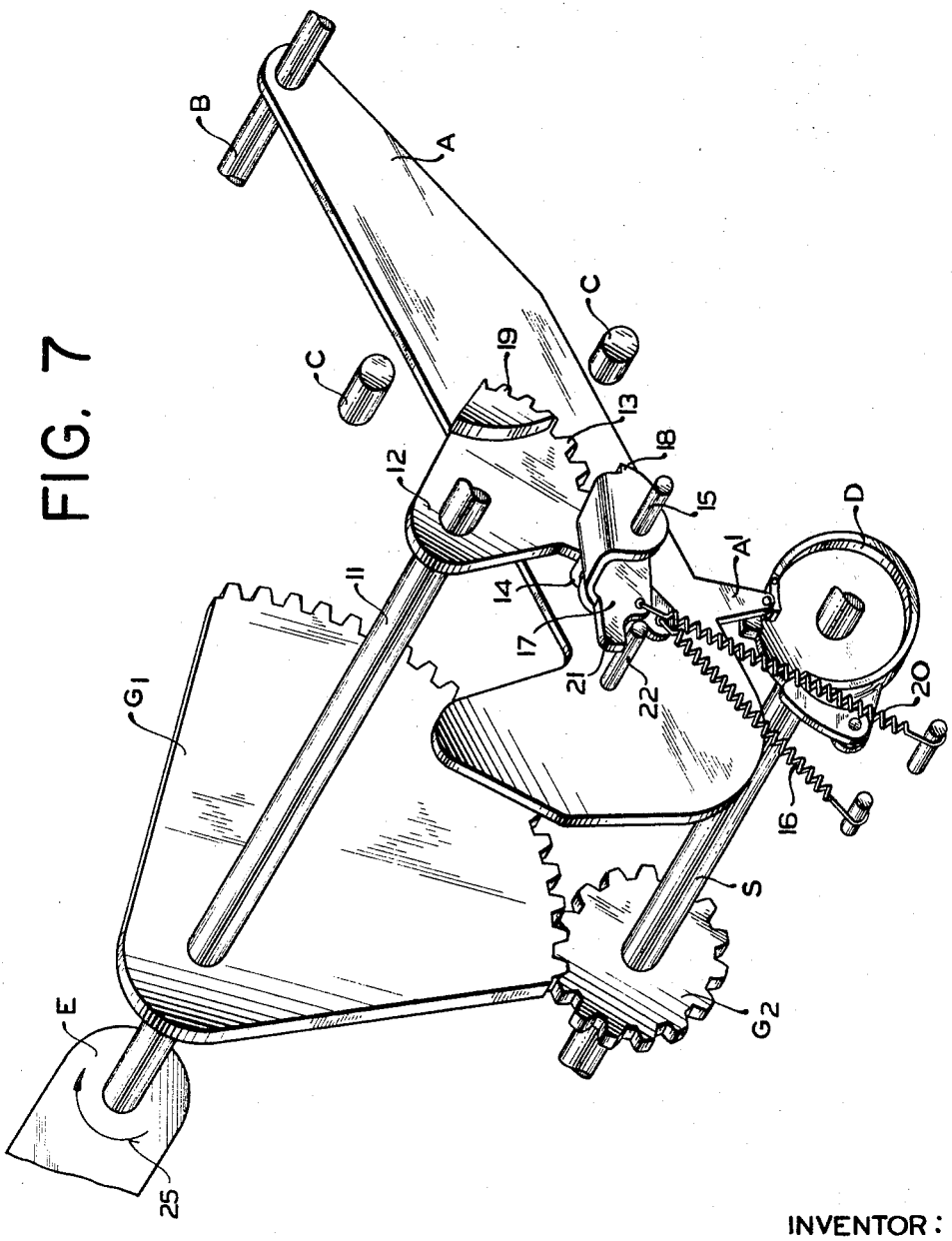

United States Patent Office 3,327,543
Patented June 27, 1967

3,327,543
REVERSE-MOTION-PRECLUDING
RATCHET MECHANISM
Hans Nirenberg, Frankfurt am Main, Germany, assignor to Telefonbau und normalzeit G.m.b.H., Frankfurt am Main, Germany
Filed June 8, 1965, Ser. No. 462,257
Claims priority, application Germany, June 10, 1964, T 26,345
3 Claims. (Cl. 74—17.5)

This invention relates to ratchet mechanisms for controlling the movements of oscillating parts to preclude untimely reversal of the sense, or direction, of their motion.

It is a general object of this invention to provide improved reverse-motion-precluding ratchet mechanisms.

In some oscillating mechanical operating systems having two extreme limit positions it is often necessary, and desirable, to provide ratchet mechanisms precluding a reversal of the direction of movement of the system before the system has fully reached either of its two limit positions.

It is, therefore, another object of this invention to provide improved ratchet mechanisms of the aforementioned description.

Ratchet mechanisms of the aforementioned description may comprise a ratchet or latch, spring-biased to engage a system of teeth in a driving element, or in some part integral with the driving element. When the ratchet or latch drops into a gap formed between two contiguous teeth of the system of teeth, the driving element is allowed to move in one sense, or one direction, only, and precluded from moving in the opposite sense, or direction. When the system of teeth reaches either of its limit positions, the ratchet, or latch, is moved out of the last gap formed between two contiguous teeth of the system. It enters that gap gain upon reversal of the direction, or sense of movement, of the system of teeth and then precludes the system of teeth from moving in its original direction, or sense of movement.

It is apparent from the foregoing that the oscillatory drive, and the system of teeth integral with it, are out of control for a portion of their reciprocating motion immediately adjacent to the two limit positions thereof. In other words, in such devices the oscillatory drive, and the system of teeth integral with it, may change their direction, or sense of movement, after the aforementioned ratchet has left the last gap formed between contiguous teeth of the aforementioned system of teeth, and before said ratchet has re-entered that gap.

It is another object of this invention to provide reverse-motion-precluding ratchet mechanisms which are not subject to the above drawback, or limitation, i.e. wherein that portion, of the oscillatory motion of the drive wherein there is no effective control against a reversal of its sense, or direction, of motion is minimized, or altogether eliminated.

Ratchet mechanisms of the aforementioned description are used extensively in postage meters and like vending machines.

It is, therefore, another object of this invention to provide improved ratchet mechanisms for use in postage meters and like vending machines.

The foregoing and other general and special objects of the invention and advantages thereof will more clearly appear from the ensuing particular description of the invention, as illustrated in the accompanying drawings, wherein:

FIG. 5 is a front view of the structure of FIG. 1, showing the constituent parts thereof while in the process of moving from the limit position of FIG. 1 to the limit position of FIG. 3;

FIG. 6 is a front view of the structure of FIG. 1 showing the constituent parts thereof while in the process of moving from the limit position of FIG. 3 to the limit position of FIG. 1; and FIG. 7 is an isometric view of the structure shown in FIGS. 1–6 showing some additional parts which have not been illustrated in FIGS. 1–6.

Figure 1:
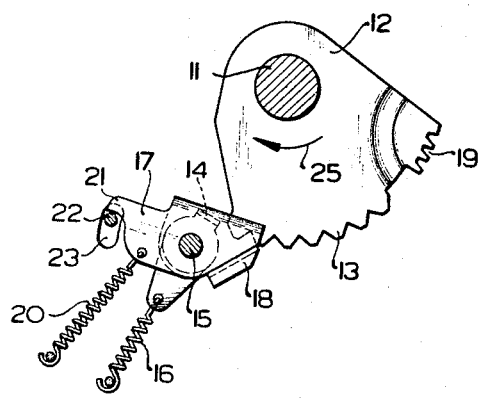
FIG. 1 is a front view of a reverse-motion-precluding ratchet mechanism in one of the limit positions thereof.
Figure 2:
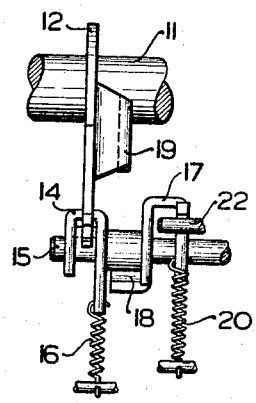
FIG. 2 is a side elevation of the structure of FIG. 1, showing the constituent parts thereof in the same positions as FIG. 1.

Referring now to the drawings, numeral 11 has been applied to indicate an oscillatory shaft supporting a segment 12 provided with a system of teeth 13. Ratchet 14 is arranged in the path of movement of the system of teeth 13. Ratchet 14 is substantially U-shaped, and both its flange portions are pivotally mounted on fixed shaft 15. Spring 16 is attached with one end thereof to one of the flange portions of ratchet 14 and tends to maintain ratchet 14 in the position shown in FIG. 1. Reference numeral 17 has been applied to indicate an additional or auxiliary ratchet which is substantially U-shaped and pivotally mounted on shaft 15 with both its flange portions. Knife edge 18 is integral with one of the flange portions of ratchet 17 and intended to cooperate with an additional system 19 of teeth provided on segment 12. Spring 20 is attached with one end thereof to the other flange portion of ratchet 17. Spring 20 tends to maintain ratchet 17 in the position thereof shown in FIG. 3. Reference numeral 22 has been applied to indicate a control pin arranged to reciprocate inside of an oblong slot or groove 23 of a fixed element. Control pin 22 is arranged in the path of the movement of a projection or cam 21 on the flange portion of ratchet 17 to which spring 20 is attached.

If control pin 22 is in the position shown in FIG. 1, ratchet 17 is pivoted about shaft 15 against the bias of spring 20. In that position of ratchet 17 its knife edge 18 cannot cooperatively engage the system 19 of teeth. When control pin 22 has been moved from the position shown in FIG. 1 to the position shown in FIG. 3, then ratchet 17 is free to pivot about shaft 15 and its knife edge 18 may cooperatively engage the system 19 of teeth, as clearly shown in FIG. 3.

Assuming that FIG. 1 shows the initial position of the constituent parts of the mechanism, and further assuming that operating shaft 11 is being initially pivoted in clockwise direction, as seen in FIG. 1 i.e. in the direction of arrow 25 of FIG. 1, then it is apparent that the first tooth of the system 13 of teeth will engage ratchet 14. Therefore ratchet 14 will drop consecutively into the gaps formed between the teeth of system 13. This precludes reverse motion of part 12, i.e. a motion thereof opposite to the direction of the arrow 25 of FIGS. 1 and 5, FIG. 5 clearly showing the reverse motion precluding action of ratchet 14.

As driving shaft 11 comes close to one of its limit positions, the last tooth of the system 13 of teeth disengages from ratchet or latch 14. This particular position of the system 13 of teeth and of ratchet or latch 14 has been illustrated in FIG. 3. In that position ratchet or latch 14 is not capable of precluding a reversal of the sense of the pivotal motion of shaft 11. Ratchet 17 is provided to perform this additional task.

Figure 3:
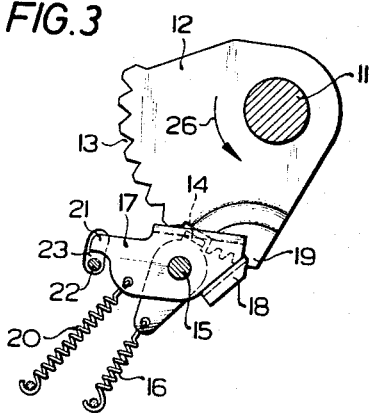
FIG. 3 is a front view of the structure of FIG. 1, showing the constituent parts thereof in the other limit position.
Figure 4:
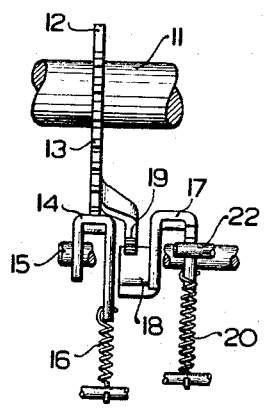
FIG. 4 is a side elevation of the structure of FIG. 1, showing the constituent parts thereof in the same limit position as FIG. 3.

As shaft 11 and segment 12 approach their limit position shown in FIG. 3, control pin 22 is being shifted from its limit position shown in FIG. 1 to its limit position shown in FIG. 3. The means for shifting control pin 22 are shown in detail in FIG. 7. FIGS. 5 and 6 show that pin 22 is supported by a lever A capable of pivoting in opposite directions, as indicated by a pair of opposite arrows. Any conventional means may be used for operating the lever supporting pin 22 as, for instance, a cam under the control of driving shaft 11. As a result of the shift of control pin 22 from the position of FIG. 1 to that of FIG. 3, ratchet or latch 17 is free to pivot under the bias of spring 20 about pivot 15, thus causing its knife edge 18 to drop into the system 19 of teeth. This position of ratchet or latch 17 and of teeth 19 has been shown in FIGS. 3 and 6.

If the sense of the pivotal motion of driving shaft 11 is now reversed, as indicated by arrow 26 of FIGS. 3 and 6, knife edge 18 immediately blocks segment 12, precluding it to revert to its initial sense of pivotal motion, i.e. that indicated by arrow 25 of FIGS. 1 and 5. Ratchet or latch 17 remains effective at least to a point of time when the last tooth of system 13 pivots ratchet or latch 14, and thereby causes the latter to drop into the gap formed between said tooth and the tooth immediately adjacent thereto. Thereupon control pin 22 may be shifted from its lower position shown in FIG. 3 to its upper position shown in FIG. 1.

Shaft 11 may be the operating shaft of a postage meter manually operable by a lever supported on shaft 11. Segment 12 on shaft 11 may operate a rack (not shown) which, in turn, may operate a counter (not shown). The aforementioned rack may be supported by a pivotable member supporting pin 22. Since the counter of such a postage-meter is operated by the aforementioned rack, the motion of the latter must be completed to assure that a correct count be made by the counter. The novel auxiliary ratchet mechanism associated with segment 12 makes it impossible for the latter to reverse the direction of its pivotal motion before having completed its required angular travel.

It will be apparent from FIGS. 1–6 and their context that I provide a reverse-motion-precluding mechanism forming part of a structure including an oscillatory element having a system of teeth integral therewith, which system forms a plurality of gaps between the constituent teeth thereof, said structure further including a spring-biased ratchet engaging said plurality of gaps upon movement of said oscillatory element, and said ratchet allowing movement of said oscillatory element in one direction only as long as positioned inside of one of said plurality of gaps. The reverse-motion-precluding mechanism proper includes an auxiliary system of teeth integral with said oscillator element, an auxiliary spring-biased ratchet cooperating with said auxiliary system of teeth to allow movement of said oscillatory element in one direction only as long as cooperatively engaging said auxiliary system of teeth, said auxiliary ratchet having an operative position and an inoperative position, and said reverse-motion-precluding means proper further including a control element for moving said auxiliary ratchet from said inoperative position to said operative position upon disengagement of said ratchet said plurality of gaps.

Reference character A has been applied to indicate the lever which supports pin 22 and is capable of pivoting in opposite direction (see FIGS. 5, 6 and 7). Reference character C has been applied in FIG. 7 to indicate two abutments or stops limiting the pivotal motion of lever A. Reference character D has been applied to indicate a cam for operating lever A. To this end lever A is provided with a projection A′ physically engaging cam D. Cam D is under the control of driving shaft 11. Driving shaft 11 may be operated either in clockwise direction, or in counterclockwise direction, by means of handle E. Arrow 25 of FIG. 7 indicates the clockwise operation of lever E and shaft 11 and corresponds to the arrow 25 of FIGS. 1 and 5. The motion of shaft 11 in clockwise direction and counterclockwise direction is transmitted to cam D by a pair of meshing gears $G_1$, $G_2$ of which one is in the form of a gear segment mounted on shaft 11, and the other is in the form of a pinion mounted on a shaft S supporting cam D.

It will be understood that this invention is not limited to the specific embodiment herein illustrated and described, and that the following claims are intended to cover all changes and modifications which do not depart from the true spirit and scope of the invention.

What is claimed is:

1. A reverse-motion-precluding mechanism including in combination:
    (a) an oscillatory element having a system of teeth integral therewith, said system forming a plurality of gaps between the constituent teeth thereof;
    (b) a spring-biased ratchet successively engaging said plurality of gaps upon movement of said element, said ratchet allowing movement of said element only in one direction of two opposite directions as long as positioned inside of one of said plurality of gaps; and
    (c) means for precluding free movement of said element in said one of said two opposite directions upon disengagement of said ratchet from said plurality of gaps, said free movement precluding means including an auxiliary system of teeth integral with said element, an auxiliary spring-biased ratchet cooperating with said auxiliary system of teeth to preclude movement of said element in said one of said two opposite directions as long as cooperatively engaging said auxiliary system of teeth, said auxiliary ratchet having an operative position and an inoperative position, and said movement-precluding-means further including a control element for moving said auxiliary ratchet from said inoperative position to said operative position upon disengagement of said ratchet from said plurality of gaps.

2. A reverse-motion-precluding mechanism including in combination:
    (a) an oscillatory shaft;
    (b) a first system of teeth forming a plurality of gaps therebetween jointly movable with said shaft;
    (c) a first spring-biased ratchet pivotally mounted on a pin and successively engaging said plurality of gaps upon movement of said first system of teeth, said first ratchet allowing movement of said first system of teeth only in one direction of two opposite directions as long as positioned inside one of said plurality of gaps;
    (d) a second system of teeth jointly movable with said shaft;
    (e) a second ratchet pivotally mounted on said pin and adapted to engage said second system of teeth to allow said shaft to reciprocate only in the other of said two opposite directions as long as in engagement with said second system of teeth;
    (f) a spring biasing said second ratchet into engagement with said second system of teeth;
    (g) a control element cooperatively engaging said second ratchet against the bias of said second spring to cause disengagement of said second ratchet from said second system of teeth; and
    (h) means controlled by the position of said shaft to operate said control element to allow engagement of said second system of teeth by said second ratchet.

3. A reverse-motion-precluding mechanism including in combination:
    (a) an oscillatory shaft;
    (b) a toothed segment mounted on said shaft for joint motion with said shaft;
    (c) a first system of teeth on said segment forming a plurality of gaps between the constituent teeth thereof, said first system of teeth being arranged substantially in a first general plane;
(d) a pivot pin arranged at right angles to the plane defined by said segment;
(e) a first spring-biased ratchet pivotally mounted on said pivot pin, said first ratchet successively engaging said plurality of gaps upon movement of said first system of teeth, said first ratchet allowing movement of said segment in one direction only;
(f) a second system of teeth on said segment angularly displaced in regard to said first system of teeth and arranged in a second general plane axially spaced from said first general plane;
(g) a second ratchet pivotally mounted on said pivot pin;
(h) a spring biasing said second ratchet into engagement with said second system of teeth to allow said segment to move only in an opposite direction; and
(i) means under the control of said shaft for selectively shifting said second ratchet out of engagement with said second system of teeth and for allowing said second ratchet to engage said second system of teeth under the bias of said spring.

References Cited

UNITED STATES PATENTS

| | | | |
|---|---|---|---|
| 2,577,199 | 12/1951 | Klopner | 74—17.5 |
| 2,627,752 | 2/1953 | Nicolaus | 74—17.5 |

FOREIGN PATENTS

| | | |
|---|---|---|
| 813,672 | 3/1937 | France. |

MILTON KAUFMAN, *Primary Examiner.*